United States Patent Office 2,967,882
Patented Jan. 10, 1961

2,967,882

PREPARATION OF ACRYLIC ACID ESTERS

Jesse T. Dunn and William R. Proops, Charleston, W. Va., assignors to Union Carbide Corporation, a corporation of New York No Drawing. Filed Apr. 1, 1958, Ser. No. 725,483

9 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl, or other catalyst, for example, the complex triphenyl phosphine-nickel halide compounds, or the complex nickel halide-quaternary ammonium compounds.

It has now been found that the complex combinations obtained by the admixture of a nickel halide with a disulfide of an organic sulfur-phosphorus-containing acid are very efficient catalysts for the production of acrylic acid esters from acetylene, carbon monoxide and an alcohol at milder conditions of temperature and pressure than heretofore employed.

The catalyst complexes suitable for use as catalysts in this invention are prepared by admixing a nickel halide, such as nickel bromide, nickel chloride, nickel fluoride and nickel iodide, with a disulfide of an organic sulfur-phosphorus-containing acid. In preparing the complex it is immaterial which component is added to the other. While the complex is an active catalyst, its exact chemical composition is not yet known.

The disulfides of the organic sulfur-phosphorus-containing acids useful in preparing the catalyst complexes of this invention contain the pentavalent phosphorus atom in what we call the bis-(phosphorthio) disulfide radical as represented by the general formula:

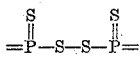

The suitable disulfides are the disulfides of the organic dithiophosphoric acid compounds, which can be represented by the general formula:

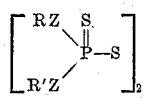

or the disulfides of the organic dithiophosphonic acid compounds, which can be represented by the general formula:

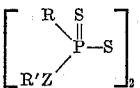

or the disulfides of the organic dithiophosphinic acid compounds, which can be represented by the general formula:

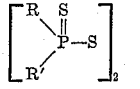

wherein R and R' when taken singly can represent an unsubstituted or substituted alkyl radical containing up to about 22 carbon atoms or more, such as methyl, ethyl, propyl, butyl, chloroethyl, chloropropyl, methoxyethyl, methoxyethoxyethyl, 2-ethylhexyl, benzyl, phenethyl, and the like, an unsubstituted or substituted aryl radical such as phenyl, naphthyl, tolyl, xylyl, chlorophenyl, dichlorophenyl, nitrophenyl, nitrotolyl, and the like, a trihydrocarbylsilanyl radical, for example, a trialkyl- or triarylsilanyl radical such as triethylsilanyl or triphenylsilanyl and the like; and Z represents an oxygen atom or an amido (—NH— or —NR—) radical; and when taken together RZ and R'Z can represent a cyclic dioxa nucleus or a substituted cyclic dioxa nucleus. By the term "cyclic dioxa nucleus" is meant a cyclic group as represented by the following formula:

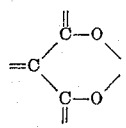

wherein the two oxygen atoms (Z) are connected to the phosphorus atom of the group

and wherein the carbon atoms of the dioxa nucleus have their other valences satisfied by hydrogen atoms or other radicals. Hereinafter the terms "alkyl radicals" and "aryl radicals" will be used to represent both the unsubstituted and substituted radicals.

Illustrative of the disulfides of the organic dithiophosphoric acid compounds which are suitable for use in this invention there may be mentioned the disulfides of O,O'-dicresyldithiophosphoric acid, O,O' - di - (2,4 - dichlorophenyl)-dithiophosphoric acid, O,O'-di-(4-nitrophenyl)-dithiophosphoric acid, O,O'-diethyldithiophosphoric acid, O,O'-di-(2-ethylhexyl)-dithiophosphoric acid, O,O'-di-(2-methoxyethyl) - dithiophosphoric acid, O,O' - di - [2 - (2-methoxyethoxy)ethyl]-dithiophosphoric acid, O,O'-di-(2-ethylbutyl)-dithiophosphoric acid, O,O'-di-(triethylsilanyl)-dithiophosphoric acid, O,O'-di-triphenylsilanyl)-dithiophosphoric acid, N,N'-dipropyldiamidodithiophosphoric acid, N-methyl-N'-propyldiamido-dithiophosphoric acid, N,N'-diphenyldiamidodithiophosphoric acid, 5,5-diethyl-2-mercapto-2-thiono-1,3,2-dioxaphosphorinane, 5-ethyl - 2 - mercapto - 4 - propyl - 2 - thiono - 1,3,2 - dioxaphosphorinane, 2,4-dioxa-P-mercapto-5-methyl-P-thiono-3-phosphabicyclo [4.4.0] decane, and the like.

Among the disulfides of the organic dithiophosphonic acid compounds suitable for use in this invention are the disulfides of O-cresyl ethanedithiophosphonic acid, O-ethyl propanedithiophosphonic acid, O-phenyl benzenedithiophosphonic acid, O-(2-ethylhexyl) toluenedithiophosphonic acid, propylamidomethanedithiophosphonic acid, anilino benzenedithiophosphonic acid, tolylamido butanedithiophosphonic acid, and the like.

Illustrative disulfides of organic dithiophosphinic acid compounds suitable for use in this invention are the disulfides of diethyldithiophosphinic acid, diphenyldithiophosphinic acid, di-(chlorophenyl)-dithiophosphinic acid, ditolyldithiophosphinic acid, (phenyl)-ethyldithiophosphinic acid, (p-bromophenyl)-phenyldithiophosphinic acid, and the like.

The catalyst complex can be prepared by adding the disulfide of the organic sulfur-phosphorus-containing acid, which has a pentavalent phosphorus atom in the bis-phosphorthio disulfide radical, to the alcohol reactant to be used in producing the acrylic acid ester, and then adding the nickel halide thereto, or the reverse order of addition can be used.

The starting alcohols are preferably the aliphatic monohydroxy saturated alcohols having up to about 22 carbon atoms, and preferably from about 1 to about 12 carbon atoms in the molecule. Illustrative alcohols are ethanol, pentanol, 2-ethylhexanol, dodecanol, 3-ethyl-2-pentanol, ethylene glycol monomethyl ether, ethylene glycol monoethyl ether, and the like.

The acrylic acid esters are produced by the interaction of acetylene with carbon monoxide and an alcohol at elevated temperature and under increased pressure in the presence of a catalytic amount of the complex combination produced with a nickel halide and a disulfide of an organic dithiophosphoric acid.

The reaction is successfully carried out with our catalyst complex at temperatures of from about 90° C. to about 250° C. or higher. Temperatures of from about 100° C. to about 200° C. are preferred. The reaction can be expedited by the use of slight pressures; and we prefer to work at pressures exceeding about 100 p.s.i.g., with pressures of from about 400 p.s.i.g. to about 500 p.s.i.g. most preferred. Higher pressures can, of course, be used with proper precautions.

The mole ratio of nickel halide to disulfide of the organic sulfur-phosphorus-containing acid can be varied over wide limits, and does not appear to be critical; nevertheless, we prefer to employ equimolar amounts of each component. The amount of catalyst complex charged to the reaction mixture is not critical, and can be varied over a wide range so long as a catalytic amount is present. When based on the alcohol charged, it has been found that a catalyst complex containing about 0.0622 mole each of the nickel halide and the disulfide of the organic sulfur-phosphorus-containing acid per 16 moles of alcohol yields the highest conversions from an economical viewpoint. Higher concentrations of catalyst would give a faster reaction, but would require a greater expense in catalyst cost; while lower concentrations would be more economical as far as catalyst cost is concerned, but the productivity would suffer.

The reaction can be carried out in a batch-wise or in a continuous manner by methods which are known to the art. The acetylene and carbon monoxide can be added separately, or for reasons of safety, as a mixture of gases, which mixture can be widely varied in composition.

The following examples further serve to illustrate this invention. Parts are by weight unless otherwise specified.

*Example 1*

A three-liter stainless steel rocking autoclave was charged with 740 g. of ethanol, 38.5 g. of the disulfide of O,O'-dicresyldithiophosphoric acid

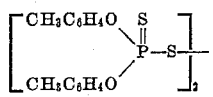

and 13.6 g. of nickel bromide, sealed and purged with carbon monoxide and then with a 1:1 mixture, by volume, of acetylene and carbon monoxide. The autoclave was rocked and the pressure increased to 40 p.s.i.g. by the further addition of the acetylene-carbon monoxide mixture. The gas addition was halted and the autoclave was heated to 100° C., at which time the pressure was increased 25 p.s.i.g. by the addition of acetylene. The total pressure was then increased to 300 p.s.i.g. with the acetylene-carbon monoxide mixture, and heating continued to a temperature of 150° C. At this point the pressure was increased to 450 p.s.i.g., and maintained between 400 p.s.i.g. to 450 p.s.i.g. by the periodic addition of the acetylene-carbon monoxide mixture for 3.8 hours. During this period the temperature was maintained between 150° C. to 170° C. The reaction was stopped by cooling the autoclave with air, and then releasing the pressure. The reaction mixture was filtered to remove solid materials, and the filtrate was distilled to separate the monomeric ethyl acrylate, most of which distilled as the ethyl acrylate-ethanol azeotrope, from the higher boiling acrylate esters and polymer-containing residue. The total yield of monomeric ethyl acrylate obtained was 410 g.

In similar manner one produces the propyl or butyl esters of acrylic acid by substituting the appropriate alcohol for ethanol.

*Example 2*

In the manner described in Example 1, 740 g. of ethanol was treated with acetylene and carbon monoxide at 143° C. to 154° C. over a 5 hour period in the presence of a complex combination of 13.6 g. of nickel bromide and 44 g. of the disulfide of di-(2-ethylhexyl)-dithiophosphoric acid

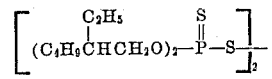

as catalyst. The yield of monomeric ethyl acrylate was 394 g.

*Example 3*

In the manner described in Example 1, 740 grams of ethanol was treated with acetylene and carbon monoxide at 143° C. to 150° C. over a 5¾ hour period in the presence of a complex combination of 13.6 g. of nickel bromide and 28 g. of the disulfide of 5,5-diethyl-2-mercapto-2-thiono-1,3,2-dioxaphosphorinane

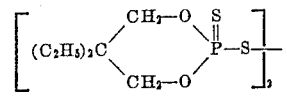

as catalyst. The yield of monomeric ethyl acrylate was 445 g.

*Example 4*

In the manner described in Example 1, 740 grams of ethanol was treated with acetylene and carbon monoxide at 150° C. to 170° C. over a 5 hour period in the presence of a complex combination of 13.6 g. of nickel bromide and 31 g. of the disulfide of diphenyl dithiophosphinic acid

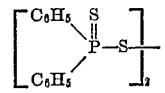

as catalyst. The yield of monomeric ethyl acrylate was 340 g.

What is claimed is:

1. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and a disulfide of an organic sulfur-phosphorus-containing acid compound having pentavalent phosphorus in the bis-(phosphorthio) disulfide radical thereof, said bis-(phosphorthio) disulfide radical having the formula:

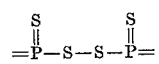

in which all of the free valences bonds thereof are satisfied by members selected from the group consisting of R, R', RZ and R'Z groups, wherein R and R' singly are members selected from the group consisting of alkyl radicals containing up to about 22 carbon atoms, aryl radicals selected from the group consisting of a phenyl and naphthyl radical, and trihydrocarbylsilanyl radicals; Z represents a member selected from the group consisting of an oxygen atom and an amido radical; and when taken together RZ and R'Z attached to the same phosphorus atom represent a cyclic dioxa nucleus.

2. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and a disulfide of an organic dithiophosphoric acid selected from the group represented by the general formula:

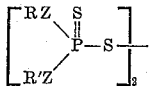

wherein R and R' singly are members selected from the group consisting of alkyl radicals containing up to about 22 carbon atoms, aryl radicals selected from the group consisting of a phenyl radical and naphthyl radical and trihydrocarbylsilanyl radicals; Z represents a member selected from the group consisting of an oxygen atom and an amido radical; and when taken together RZ and R'Z represent a cyclic dioxa nucleus.

3. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and a disulfide of an organic dithiophosphinic acid selected from the group represented by the general formula:

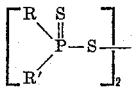

wherein R and R' represent members selected from the group consisting of alkyl radicals containing up to about 22 carbon atoms, aryl radicals selected from the group consisting of a phenyl radical and naphthyl radical and trihydrocarbylsilanyl radicals.

4. In the manufacture of an acrylic acid ester by heating at a temperature between about 90° C. and about 250° C. and under a pressure exceeding 100 p.s.i.g. an aliphatic monohydroxy saturated alcohol having from 1 to about 12 carbon atoms with carbon monoxide and acetylene, the improvement which comprises carrying out the reaction in the presence of a catalyst complex combination of a nickel halide and a disulfide of an organic dithiophosphoric acid selected from the group represented by the general formula:

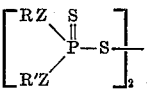

wherein R and R' singly are members selected from the group consisting of alkyl radicals containing up to about 22 carbon atoms, aryl radicals selected from the group consisting of a phenyl radical and naphthyl radical and trihydrocarbylsilanyl radicals; Z represents a member selected from the group consisting of an oxygen atom and an amido radical; and when taken together RZ and R'Z represent a cyclic dioxa nucleus.

5. In the manufacture of an acrylic acid ester by heating at a temperature between about 90° C. and about 250° C. and under a pressure exceeding 100 p.s.i.g. an aliphatic monohydroxy saturated alcohol having from 1 to about 12 carbon atoms with carbon monoxide and acetylene, the improvement which comprises carrying out the reaction in the presence of a catalyst complex combination of a nickel halide and a disulfide of an organic dithiophosphinic acid selected from the group represented by the general formula:

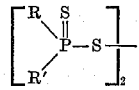

wherein R and R' represent members selected from the group consisting of alkyl radicals containing up to about 22 carbon atoms, aryl radicals selected from the group consisting of a phenyl radical and naphthyl radical and trihydrocarbylsilanyl radicals.

6. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and

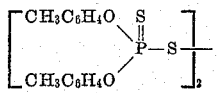

7. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and

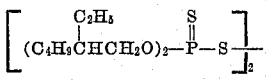

8. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and

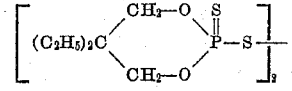

9. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and

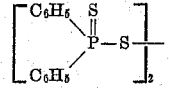

References Cited in the file of this patent

UNITED STATES PATENTS 2,806,040    Reppe et al.             Sept. 10, 1957

FOREIGN PATENTS 805,641    Germany               May 25, 1951